(12) United States Patent
Bowden et al.

(10) Patent No.: US 8,191,743 B1
(45) Date of Patent: Jun. 5, 2012

(54) REMOVABLE RECREATIONAL VEHICLE CARRY APPARATUS

(76) Inventors: Douglas M. Bowden, London (GB); Lynn Bowden, London (GB)

( * ) Notice: Subject to any disclaimer, the term of this patent is extended or adjusted under 35 U.S.C. 154(b) by 248 days.

(21) Appl. No.: 12/786,048

(22) Filed: May 24, 2010

(51) Int. Cl.
*B60P 9/00* (2006.01)

(52) U.S. Cl. ........ 224/402; 224/310; 224/494; 224/519; 224/511

(58) Field of Classification Search .......... 224/519, 224/518, 522, 402–405, 488, 492, 494, 511, 224/513, 310, 319, 327; 414/462
See application file for complete search history.

(56) References Cited

U.S. PATENT DOCUMENTS

| | | | | |
|---|---|---|---|---|
| 3,734,321 A | * | 5/1973 | Long et al. | 414/462 |
| 3,972,433 A | * | 8/1976 | Reed | 414/462 |
| 4,234,285 A | | 11/1980 | Martinez | |
| 4,239,438 A | * | 12/1980 | Everson | 414/462 |
| 4,274,788 A | * | 6/1981 | Sutton | 414/462 |
| 4,953,757 A | * | 9/1990 | Stevens et al. | 224/310 |
| 5,071,308 A | * | 12/1991 | Tibbet | 414/462 |
| 5,609,462 A | * | 3/1997 | Reimer | 414/462 |
| 6,513,849 B2 | * | 2/2003 | Carter | 296/3 |
| 6,755,332 B2 | | 6/2004 | Crane et al. | |
| 6,981,835 B1 | | 1/2006 | Groth | |
| 8,133,000 B2 | * | 3/2012 | Olson et al. | 414/538 |
| 2007/0177964 A1 | | 8/2007 | Bosela | |
| 2008/0019812 A1 | | 1/2008 | Moryski | |
| 2009/0065543 A1 | * | 3/2009 | Bone | 224/500 |

* cited by examiner

*Primary Examiner* — Justin Larson
*Assistant Examiner* — Corey Skurdal

(57) ABSTRACT

A removable recreational vehicle carry apparatus provides for removable adjustable mount to an existing host vehicle such as a car or truck. The apparatus comprises a framework that substantially surrounds the host vehicle and provides for carry of recreational vehicles, mowers, and other equipment. Stabilizing jacks are provided for added rigidity during loading and unloading. Multiple ramps with hooks and wheels provide for loading as desired. Trunks and beds of trucks remain substantially free for loading of other equipment and items.

20 Claims, 6 Drawing Sheets

REMOVABLE RECREATIONAL VEHICLE CARRY APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

A variety of devices for transporting recreational vehicles, such as boats, jet skis, and ATV's, are available, as are devices for transporting other vehicles, such as mowers, for example. Some exist as trailers. Some permanently affix to various host vehicles such as cars and trucks. The present apparatus provides a unique, removable recreational vehicle carry apparatus that can be fitted to a plurality of transporting vehicles, including cars and trucks, and further provides ramps to accommodate the various recreational vehicles, as well as other vehicles needing transport.

FIELD OF THE INVENTION

The removable recreational vehicle carry apparatus relates to recreational vehicle transporters and more especially to a recreational vehicle transport apparatus that is removably fitted to the host vehicle and that accommodates a variety of recreational vehicles and other vehicles, such as mowers.

SUMMARY OF THE INVENTION

The general purpose of the removable recreational vehicle carry apparatus, described subsequently in greater detail, is to provide a removable recreational vehicle carry apparatus which has many novel features that result in an improved removable recreational vehicle carry apparatus which is not anticipated, rendered obvious, suggested, or even implied by prior art, either alone or in combination thereof.

To attain this, the removable recreational vehicle carry apparatus provides versatility by removably mounting to a plurality of host vehicles, such as various cars and trucks. The apparatus provides for load and transport of a variety of vehicles such as recreational vehicles, mowers, and other needed items as well. The apparatus is sufficiently long to cover a truck bed and cab, for example, as well as substantially all of a typical car, and is available in various lengths and sizes. Importantly, the removable ramps provide for the bed of the truck and the trunk of a car to remain useful.

Two critical features may be provided by the apparatus design and components. First, the apparatus may be removably installed without any form of alteration to an existing host vehicle. Second, the apparatus may be easily assembled and disassembled. Of note is that the apparatus is also provided in a permanently assembled state, and also provides for, in additional embodiments, permanent attachment to a host vehicle. Each of the central vertical legs and the first end vertical legs has a frame engagement assembly. Each frame engagement assembly may be comprises of a variety of clamping mechanisms whereby the bottom of the central and vertical legs is removably clamped to a frame of a host vehicle.

Importantly, the ramps provide exteriorly disposed wheels so that any of a plurality of vehicles are easily accommodated in loading and unloading. Elongated ramp slots provide for both light weight and vehicle traction when needed. The ramps may be hooked over any of the transverse legs. Importantly, the ramps are of a length sufficient to reach from one upper transverse leg to the next, so that ramps may be combined in length to further facilitate loading and unloading of vehicles.

Thus has been broadly outlined the more important features of the improved removable recreational vehicle carry apparatus so that the detailed description thereof that follows may be better understood and in order that the present contribution to the art may be better appreciated.

An object of the removable recreational vehicle carry apparatus is to removably affix to a host vehicle.

Another object of the removable recreational vehicle carry apparatus is to provide for carrying a variety of recreational vehicles and the like.

A further object of the removable recreational vehicle carry apparatus is to provide for easily loading the vehicles.

An added object of the removable recreational vehicle carry apparatus is to easily assemble and disassemble.

Another object of the removable recreational vehicle carry apparatus is to provide removably fitted ramps.

Still another object of the removable recreational vehicle carry apparatus is to provide stability, especially during loading and unloading of vehicles and equipment.

These together with additional objects, features and advantages of the improved removable recreational vehicle carry apparatus will be readily apparent to those of ordinary skill in the art upon reading the following detailed description of presently preferred, but nonetheless illustrative, embodiments of the improved removable recreational vehicle carry apparatus when taken in conjunction with the accompanying drawings.

In this respect, before explaining the current embodiments of the improved removable recreational vehicle carry apparatus in detail, it is to be understood that the removable recreational vehicle carry apparatus is not limited in its application to the details of construction and arrangements of the components set forth in the following description or illustration.

Those skilled in the art will appreciate that the concept of this disclosure may be readily utilized as a basis for the design of other structures, methods, and systems for carrying out the several purposes of the improved removable recreational vehicle carry apparatus. It is therefore important that the claims be regarded as including such equivalent constructions insofar as they do not depart from the spirit and scope of the removable recreational vehicle carry apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 8 thereof, the principles and concepts of the removable recreational vehicle carry apparatus generally designated by the reference number 10 will be described.

Figure 1:
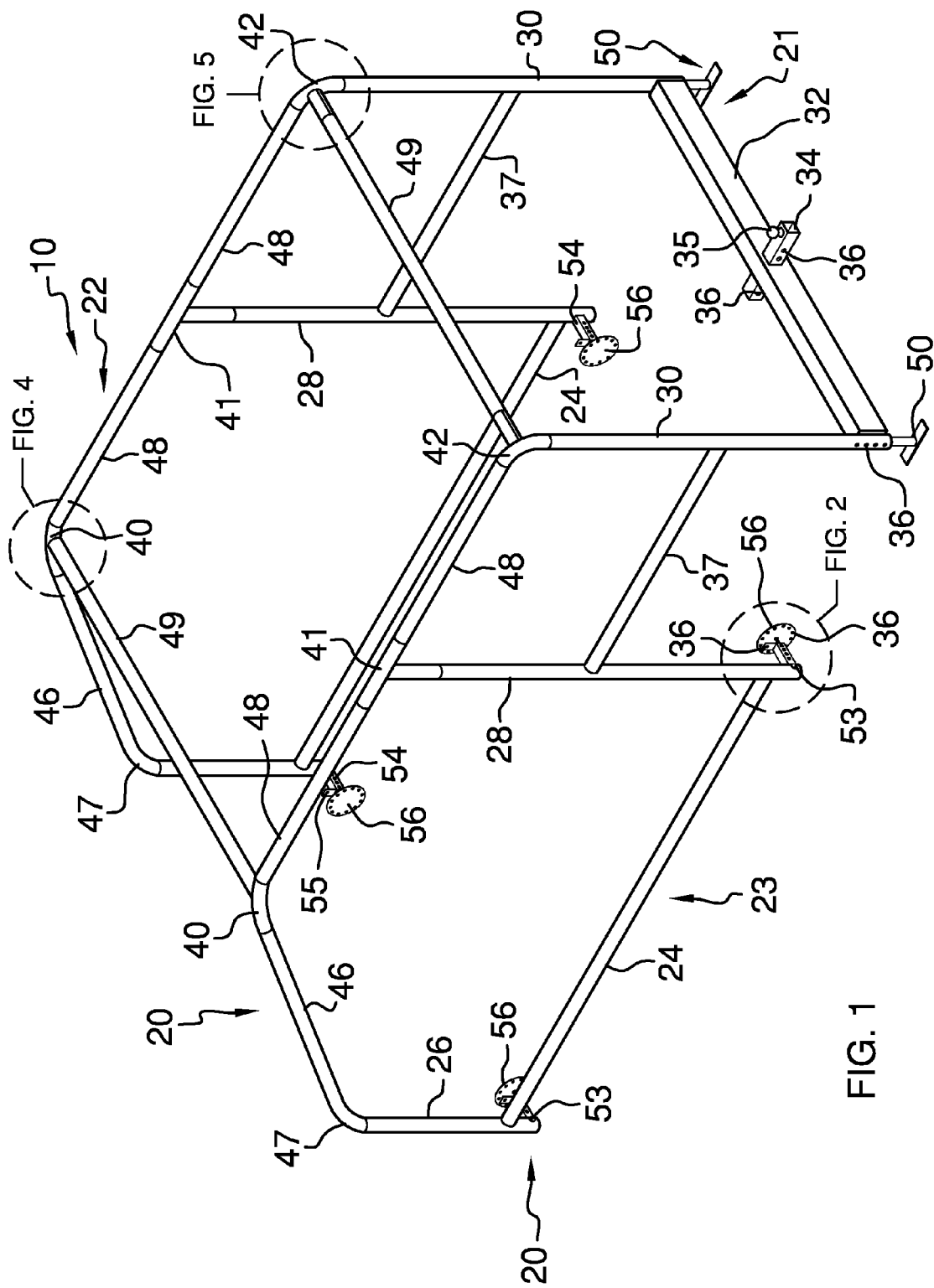
FIG. 1 is a top perspective view.

Referring to FIG. 1, the apparatus 10 has a first end 20 spaced apart from a second end 21, and a top 22 spaced apart from a bottom 23. The pair of spaced apart first end vertical legs 26 is disposed at the first end 20. A pair of spaced apart central vertical legs 28 is provided. Each central vertical leg 28 has a central leg height 29. A bottom longitudinal leg 24 connects one of each of the first end vertical legs 26 to one of each of the central vertical legs 28.

Figure 2:
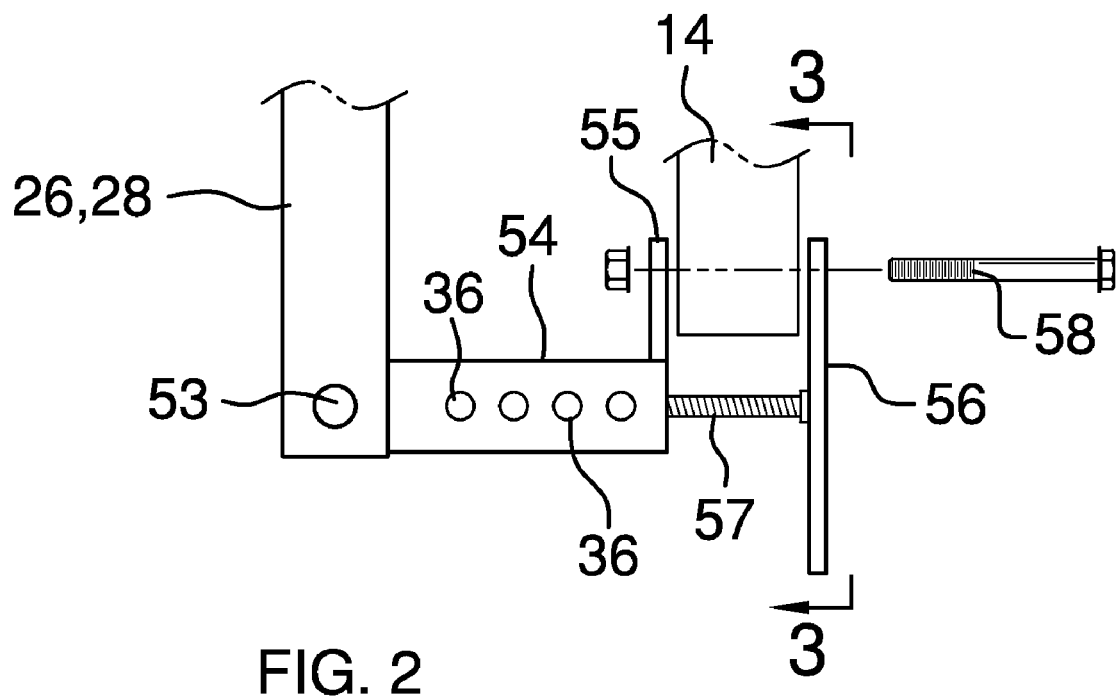
FIG. 2 is an end elevation view of a frame plate and tube hingedly connected to a vertical leg.
Figure 3:
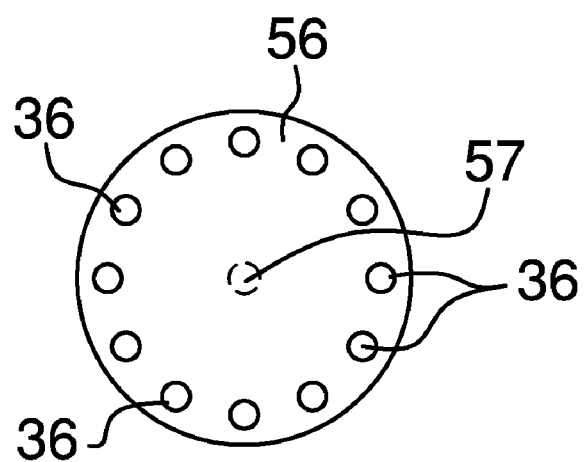
FIG. 3 is a lateral elevation view of a frame plate.
Figure 4:
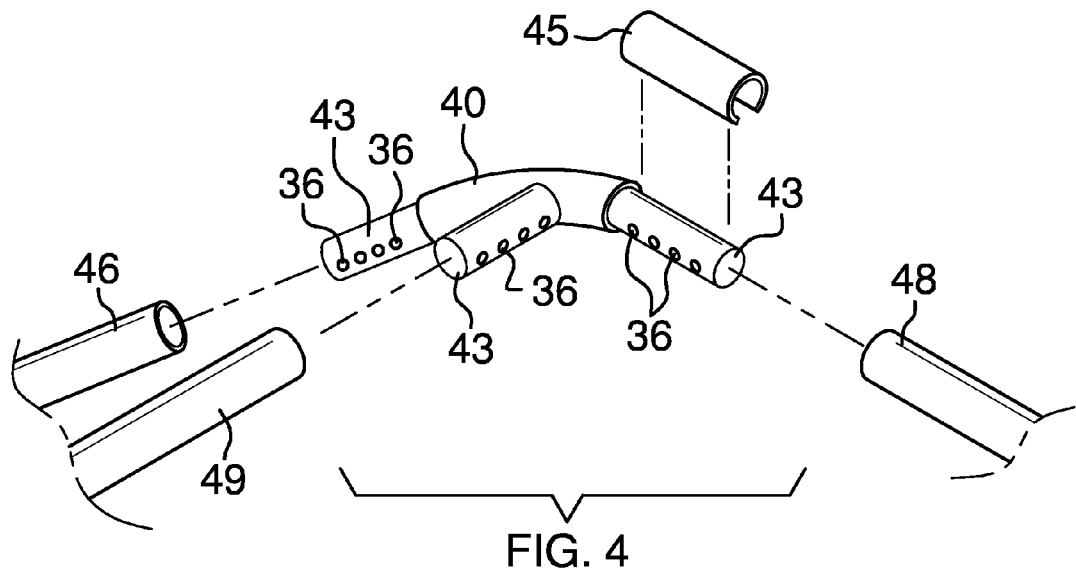
FIG. 4 is an exploded perspective view of a gradual tee and slanted leg, upper longitudinal leg, upper transverse leg, and insert cover.

Referring to FIGS. 2 and 3, each bottom longitudinal leg 24 is proximal to the bottom 23. Each of the central vertical legs 28 and the first end vertical legs 26 has a frame engagement assembly 52. Each frame engagement assembly 52 partially comprises a tube 54 connected to each first end vertical leg 26 and each central vertical leg 28 via a hinge 53 at the bottom 23. Each tube 54 has a plurality of orifices 36. A flange 55 is extended upwardly and medially from each tube 54. A circular frame plate 56 is adjustably fitted within each tube 54 via an allthread 57. Each frame plate 56 has a plurality of spaced apart perimeter orifices 36. A removable fastener 58 removably tightens each frame plate 56 to one of each one of the flanges 55. The frame plates 56 and flanges 55 are thereby removably secured to an existing vehicle frame 14 of an existing host vehicle 16. A removable fastener 58 may also be employed.

Referring again to FIG. 1, a pair of spaced apart second end vertical legs 30 is disposed at the second end 21. Each second end vertical leg 30 has a second end leg height 31 greater than the first end leg height 27. Each second end leg height 31 is equal to the central leg heights 29. A central longitudinal leg 37 connects one of each of the second end vertical legs 30 to one of each of the central vertical legs 28. The central longitudinal legs 37 are disposed about half way between the bottom 23 and the top 22. A slanted leg 46 is removably affixed upwardly to each first end vertical leg 26. Each slanted leg 46 has a downwardly disposed bend 47.

Referring to FIG. 4 and again to FIG. 1, a gradual tee 40 removably connects to each of the slanted legs 46 via an insert 43. Each gradual tee 40 is disposed at the top 22. An upper transverse leg 49 connects the gradual tees 40 via a medially disposed insert 43 on each gradual tee 40.

Referring again to FIG. 1, a pair of spaced apart straight tees 41 is provided. One of each of the straight tees 41 is removably disposed atop one of each of the central vertical legs 28 via an insert 43.

Figure 5:
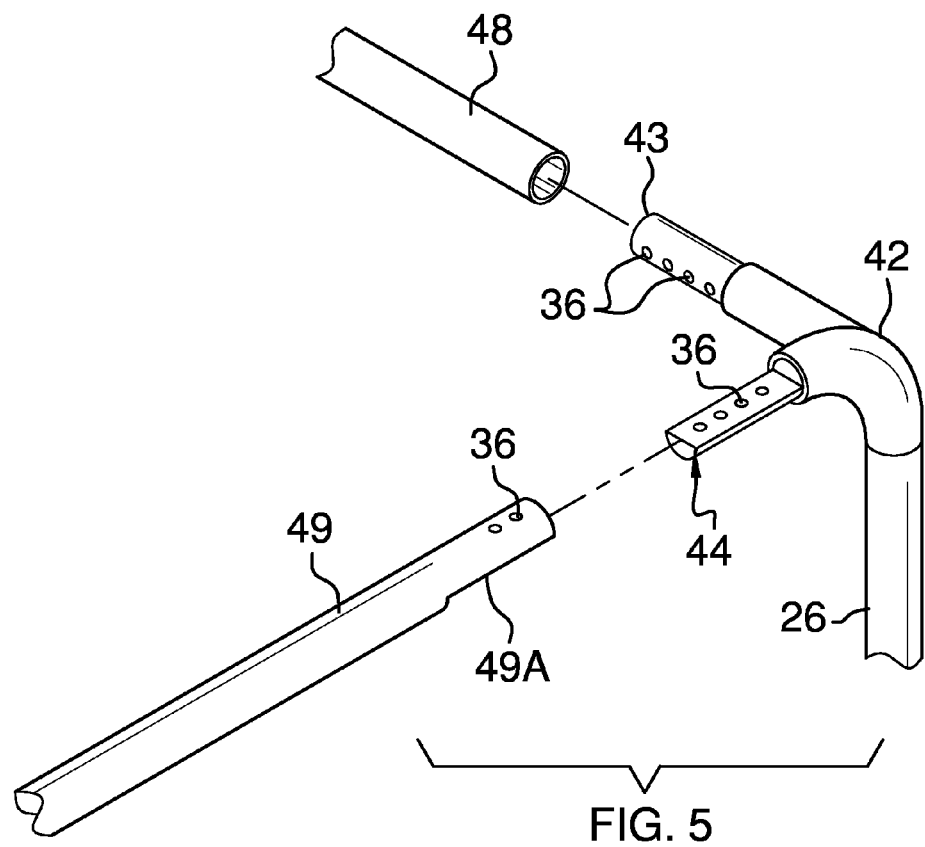
FIG. 5 is an exploded perspective view of a 90 degree tee with upper longitudinal leg, upper transverse leg, and connected first end vertical leg.
Figure 6:
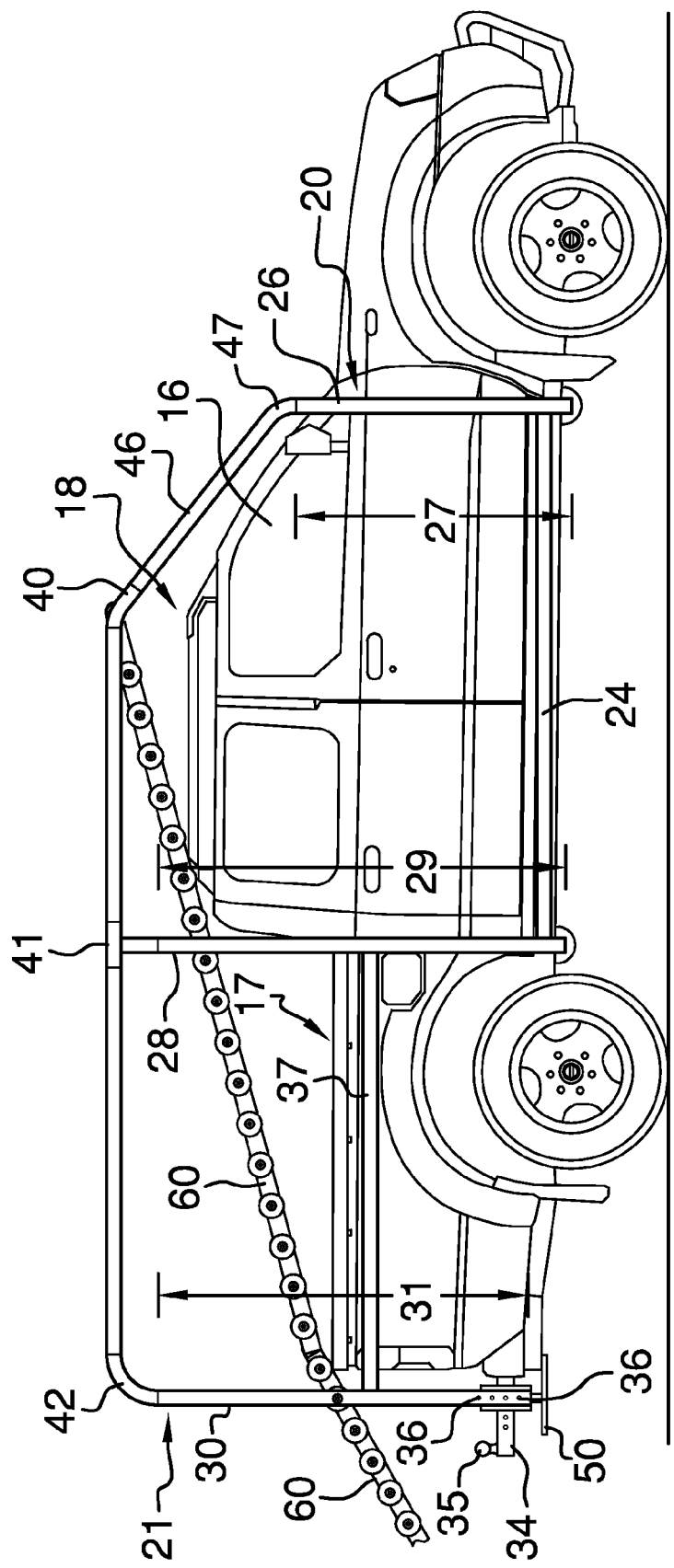
FIG. 6 is a lateral elevation view of the installed apparatus.

Referring to FIG. 5, a pair of spaced apart 90 degree tees 42 is provided. One of each of the 90 degree tees 42 is removably disposed atop one of each of the second end vertical legs 30 via an insert 43.

Referring again to FIGS. 1, 4 and 5, an upper transverse leg 49 connects the 90 degree tees 42 via inserts 43. A quartet of upper longitudinal legs 48 is provided. One of each of the upper longitudinal legs 48 connects one each of the gradual tees 40 to one of each of the straight tees 41 via inserts 43.

One of each of the upper longitudinal legs 48 connects one of each of the straight tees 41 to one of each of the 90 degree tees 42 via a leg flat side 49A on each upper longitudinal leg 48 and an insert with a flat side 44 on each 90 degree tee 42. The flat side greatly aids in apparatus 10 stability. An insert cover 45 removably covers each insert 43. A transverse leg 32 connects the second end vertical legs 30 via 90 degree tee 42 inserts 43.

Figure 7:
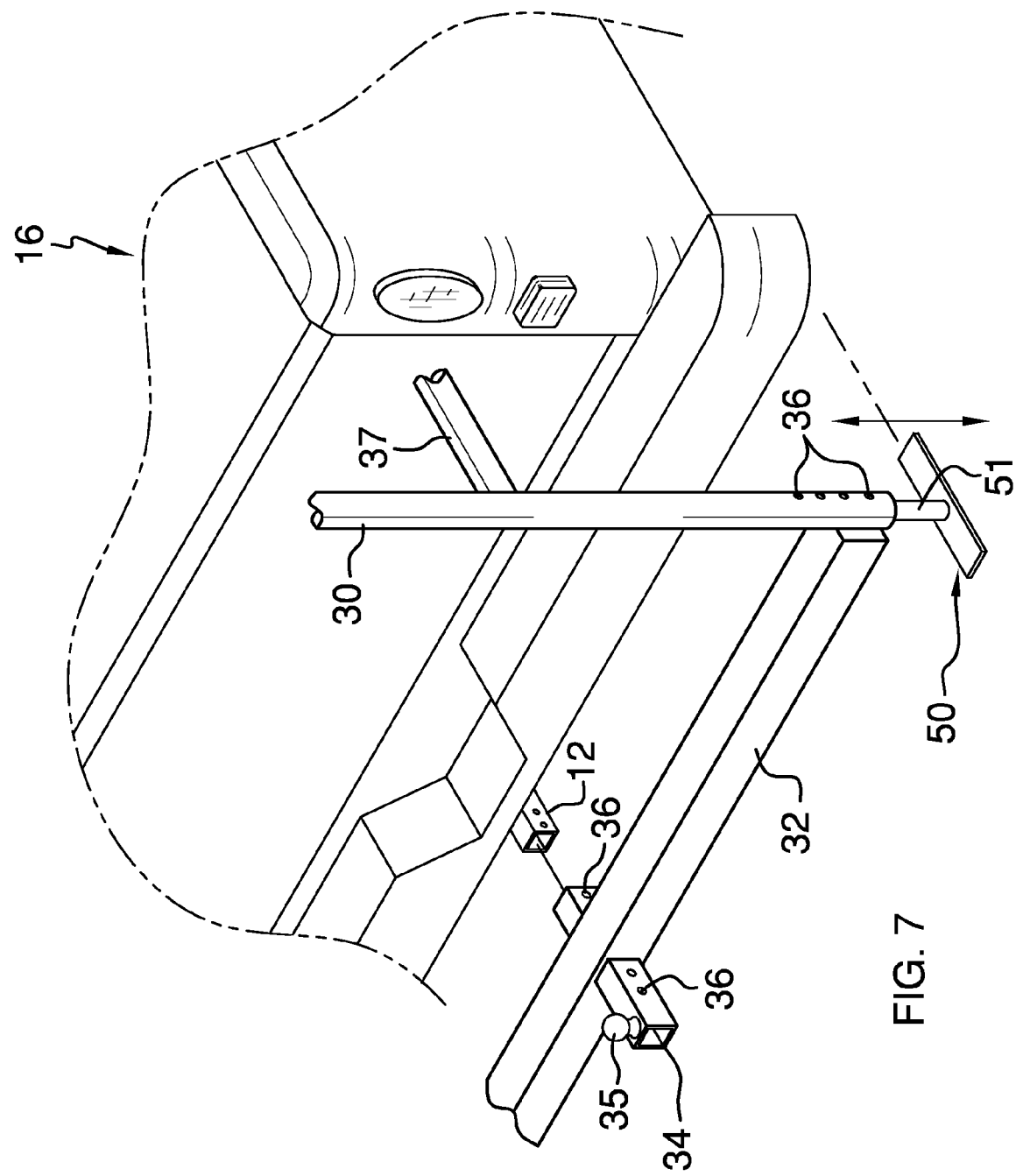
FIG. 7 is a partial second end perspective view of the hitch insert in preparation of insertion into the existing receiver hitch.

Referring to FIG. 7, the hitch insert 34 is disposed centrally and longitudinally within the transverse leg 32. The hitch insert 34 is removably inserted into an existing receiver hitch 12 of the existing host vehicle 16. The hitch ball 35 is removably disposed on the hitch insert 34 at the second end 21.

Referring again to FIGS. 1 and 7, a stabilizing jack 50 is removably and adjustably inserted into each second end vertical leg 30 via a jack insert 51 and orifices 36 in the second end vertical legs 30 at the bottom 23.

Figure 8:
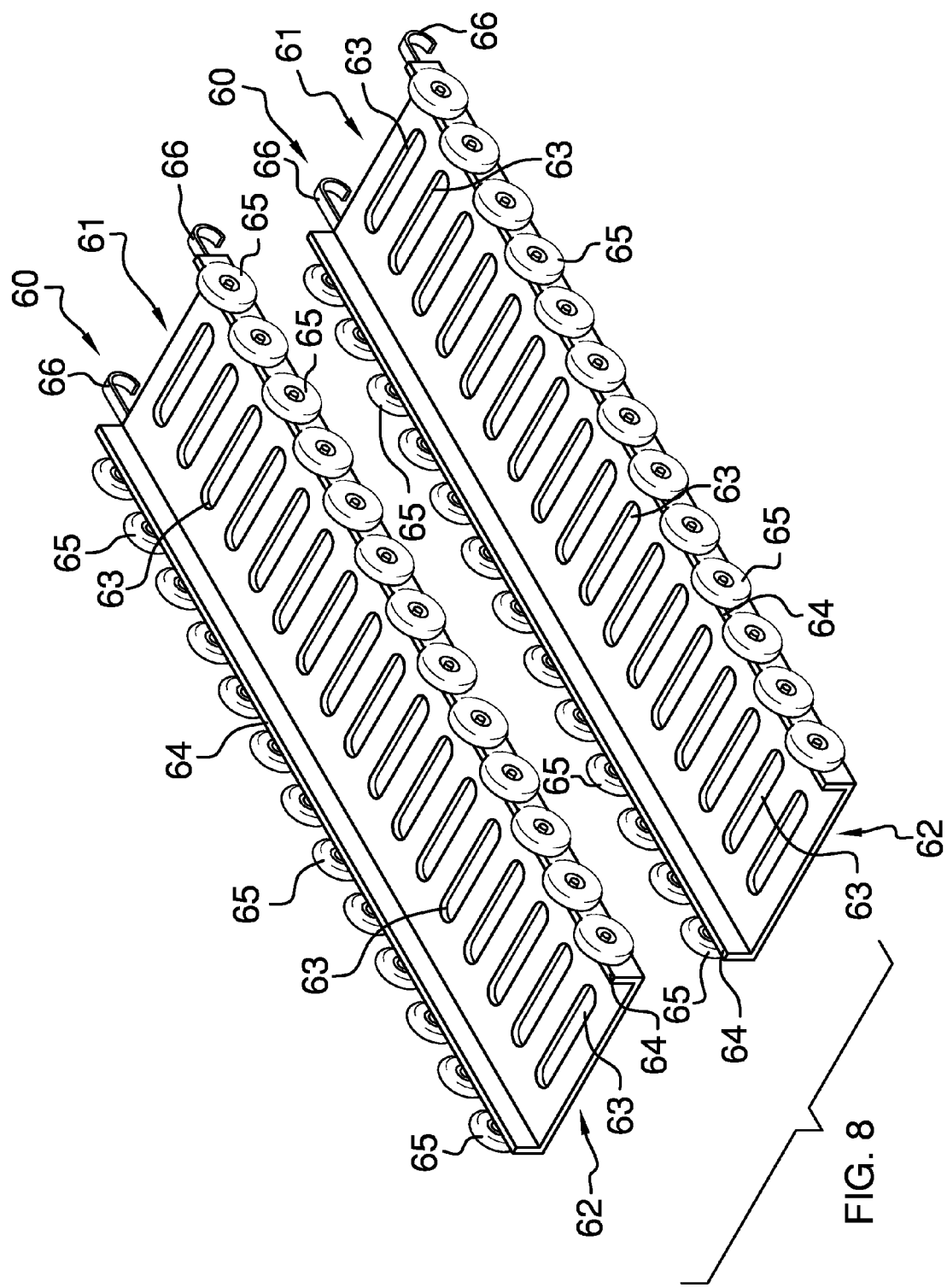
FIG. 8 is perspective view of two of the ramps.

Referring to FIG. 8, the apparatus 10 further comprises at least a one pair of ramps 60. Additional identical ramps may be provided. Each of the ramps 60 comprises a ramp first end 61 spaced apart from a ramp second end 62. A plurality of spaced apart elongated slots 63 is disposed laterally between the ramp first end 61 and the ramp second end 62. A vertical boundary 64 is disposed on an either side of each ramp 60. A pair of spaced apart downwardly curved hooks 66 is disposed on the ramp first end 61, the hooks 66 removably disposed on the upper transverse legs 49. A plurality of wheels 65 is disposed vertically and exteriorly on each ramp 60 vertical boundary 64.

With respect to the above description then, it is to be realized that the optimum dimensional relationships for the parts of the removable recreational vehicle carry apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the removable recreational vehicle carry apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the removable recreational vehicle carry apparatus may be used.

Therefore, the foregoing is considered as illustrative only of the principles of the removable recreational vehicle carry apparatus. Further, since numerous modifications and changes will readily occur to those skilled in the art, it is not desired to limit the removable recreational vehicle carry apparatus to the exact construction and operation shown and described, and accordingly, all suitable modifications and equivalents may be resorted to, falling within the scope of the removable recreational vehicle carry apparatus.

What is claimed is:

1. A removable recreational vehicle carry apparatus comprising, in combination:

a first end spaced apart from a second end, a top spaced apart from a bottom;

a pair of spaced apart first end vertical legs disposed at the first end;

a pair of spaced apart central vertical legs;
a bottom longitudinal leg connecting one of each of the first end vertical legs to one of each of the central vertical legs, each bottom longitudinal leg proximal to the bottom;
a frame engagement assembly disposed on each of the first end vertical legs and the central vertical legs, at the bottom;
whereby the apparatus is affixed to an existing frame of an existing host vehicle;
a pair of spaced apart second end vertical legs disposed at the second end;
a central longitudinal leg connecting one of each of the second end vertical legs to one of each of the central vertical legs;
a slanted leg affixed upwardly to each first end vertical leg, each slanted leg having a downwardly disposed bend;
a gradual tee connected to each of the slanted legs, each gradual tee disposed at the top;
an upper transverse leg connecting the gradual tees;
a pair of spaced apart straight tees, one of each of the straight tees disposed atop one of each of the central vertical legs;
a pair of spaced apart 90 degree tees, one of each of the 90 degree tees disposed atop one of each of the second end vertical legs;
an upper transverse leg connecting the 90 degree tees;
a quartet of upper longitudinal legs, one of each of the upper longitudinal legs connecting one of the gradual tees to one of the straight tees, one of each of the upper longitudinal legs connecting one of each of the straight tees to one of each of the 90 degree tees;
a transverse leg connecting the second end vertical legs;
at least a one pair of ramps comprising a first ramp and a second ramp, each of the pair of ramps comprising:
  a ramp first end spaced apart from a ramp second end;
  a plurality of spaced apart elongated slots disposed laterally between the ramp first end and the ramp second end;
  a vertical boundary disposed on an either side of each ramp;
  a pair of spaced apart downwardly curved hooks disposed on the ramp first end, the hooks removably disposed on the upper transverse legs;
  a plurality of wheels disposed vertically and exteriorly on each ramp vertical boundary.

2. The apparatus according to claim 1 wherein the apparatus is removably affixed to the frame of the existing host vehicle.

3. The apparatus according to claim 1 wherein the central longitudinal legs are disposed about half way between the bottom and the top.

4. The apparatus according to claim 2 wherein the central longitudinal legs are disposed about half way between the bottom and the top.

5. The apparatus according to claim 4 further comprising an insert cover removably covering each insert.

6. The apparatus according to claim 1 wherein one of each of the upper longitudinal legs connecting one of each of the straight tees to one of each of the 90 degree tees further comprises a leg flat side on each upper longitudinal leg;
  an insert with a flat side on each 90 degree tee.

7. The apparatus according to claim 2 wherein one of each of the upper longitudinal legs connecting one of each of the straight tees to one of each of the 90 degree tees further comprises a leg flat side on each upper longitudinal leg;
  an insert with a flat side on each 90 degree tee.

8. The apparatus according to claim 3 wherein one of each of the upper longitudinal legs connecting one of each of the straight tees to one of each of the 90 degree tees further comprises a leg flat side on each upper longitudinal leg;
  an insert with a flat side on each 90 degree tee.

9. The apparatus according to claim 4 wherein one of each of the upper longitudinal legs connecting one of each of the straight tees to one of each of the 90 degree tees further comprises a leg flat side on each upper longitudinal leg;
  an insert with a flat side on each 90 degree tee.

10. The apparatus according to claim 5 wherein one of each of the upper longitudinal legs connecting one of each of the straight tees to one of each of the 90 degree tees further comprises a leg flat side on each upper longitudinal leg;
  an insert with a flat side on each 90 degree tee.

11. The apparatus according to claim 6 further comprising a hitch insert disposed centrally and longitudinally within the transverse leg, the hitch insert removably inserted into an existing receiver hitch of the existing host vehicle;
  a hitch ball removably disposed on the hitch insert at the second end.

12. The apparatus according to claim 7 further comprising a hitch insert disposed centrally and longitudinally within the transverse leg, the hitch insert removably inserted into an existing receiver hitch of the existing host vehicle;
  a hitch ball removably disposed on the hitch insert at the second end.

13. The apparatus according to claim 8 further comprising a hitch insert disposed centrally and longitudinally within the transverse leg, the hitch insert removably inserted into an existing receiver hitch of the existing host vehicle;
  a hitch ball removably disposed on the hitch insert at the second end.

14. The apparatus according to claim 9 further comprising a hitch insert disposed centrally and longitudinally within the transverse leg, the hitch insert removably inserted into an existing receiver hitch of the existing host vehicle;
  a hitch ball removably disposed on the hitch insert at the second end.

15. The apparatus according to claim 10 further comprising a hitch insert disposed centrally and longitudinally within the transverse leg, the hitch insert removably inserted into an existing receiver hitch of the existing host vehicle;
  a hitch ball removably disposed on the hitch insert at the second end.

16. The apparatus according to claim 12 further comprising a stabilizing jack removably and adjustably inserted into each second end vertical leg via a jack insert;
  a plurality of orifices in the second end vertical legs at the bottom.

17. The apparatus according to claim 13 further comprising a stabilizing jack removably and adjustably inserted into each second end vertical leg via a jack insert;
  a plurality of orifices in the second end vertical legs at the bottom.

18. The apparatus according to claim 14 further comprising a stabilizing jack removably and adjustably inserted into each second end vertical leg via a jack insert;
  a plurality of orifices in the second end vertical legs at the bottom.

19. The apparatus according to claim 15 further comprising a stabilizing jack removably and adjustably inserted into each second end vertical leg via a jack insert;
  a plurality of orifices in the second end vertical legs at the bottom.

20. A removable recreational vehicle carry apparatus comprising, in combination:

a first end spaced apart from a second end, a top spaced apart from a bottom;

a pair of spaced apart first end vertical legs disposed at the first end, each first end vertical leg having a first end leg height;

a pair of spaced apart central vertical legs;

a bottom longitudinal leg connecting one of each of the first end vertical legs to one of each of the central vertical legs, each bottom longitudinal leg proximal to the bottom;

a frame engagement assembly comprising:

a hingedly connected tube disposed on each first end vertical leg and each central vertical leg at the bottom, each tube having a plurality of orifices;

a flange extended upwardly and medially from each tube;

a circular frame plate adjustably fitted within each tube via an allthread, each frame plate having a plurality of spaced apart perimeter orifices;

a removable fastener removably tightening each frame plate to an each one of the flanges;

whereby the frame plates and flanges are removably secured to an existing vehicle frame of an existing host vehicle;

a pair of spaced apart second end vertical legs disposed at the second end, each second end vertical leg having a second end leg height greater than the first end leg height, each second end leg height equal to the central leg heights;

a central longitudinal leg connecting one of each of the second end vertical legs to one of each of the central vertical legs, the central longitudinal legs disposed about half way between the bottom and the top;

a slanted leg removably affixed upwardly to each first end vertical leg, each slanted leg having a downwardly disposed bend;

a gradual tee removably connected to each of the slanted legs via an insert, each gradual tee disposed at the top;

an upper transverse leg removably connecting the gradual tees via a medially disposed insert on each gradual tee;

a pair of spaced apart straight tees, one of each of the straight tees removably disposed atop one of each of the central vertical legs via an insert;

a pair of spaced apart 90 degree tees, one of each of the 90 degree tees removably disposed atop one of each of the second end vertical legs via an insert;

an upper transverse leg removably connecting the 90 degree tees via inserts;

a quartet of upper longitudinal legs, one of each of the upper longitudinal legs removably connecting one of the gradual tees to one of the straight tees via inserts, one of each of the upper longitudinal legs connecting one of each of the straight tees to one of each of the 90 degree tees via a leg flat side on each upper longitudinal leg and an insert with a flat side on each 90 degree tee;

an insert cover removably covering each insert;

a transverse leg connecting the second end vertical legs via 90 degree tee inserts;

a hitch insert disposed centrally and longitudinally within the transverse leg, the hitch insert removably inserted into an existing receiver hitch of the existing host vehicle;

a hitch ball removably disposed on the hitch insert at the second end;

a stabilizing jack removably and adjustably inserted into each second end vertical leg via a jack insert;

a plurality of orifices in the second end vertical legs at the bottom;

at least a one pair of ramps, each ramp comprising:

a ramp first end spaced apart from a ramp second end;

a plurality of spaced apart elongated slots disposed laterally between the ramp first end and the ramp second end;

a vertical boundary disposed on an either side of each ramp;

a pair of spaced apart downwardly curved hooks disposed on the ramp first end, the hooks removably disposed on the upper transverse legs;

a plurality of wheels disposed vertically and exteriorly on each ramp vertical boundary.

* * * * *